(12) United States Patent
Nguyen et al.

(10) Patent No.: US 10,655,444 B2
(45) Date of Patent: May 19, 2020

(54) ENHANCING PROPPED COMPLEX FRACTURE NETWORKS IN SUBTERRANEAN FORMATIONS

(71) Applicant: Halliburton Energy Services, Inc., Houston, TX (US)

(72) Inventors: Philip D. Nguyen, Houston, TX (US); Ronald Glen Dusterhoft, Katy, TX (US); Matthew Lewis Lahman, Houston, TX (US); Aaron Gene Russell, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 191 days.

(21) Appl. No.: 15/758,722

(22) PCT Filed: Oct. 22, 2015

(86) PCT No.: PCT/US2015/056873
§ 371 (c)(1),
(2) Date: Mar. 8, 2018

(87) PCT Pub. No.: WO2017/069760
PCT Pub. Date: Apr. 27, 2017

(65) Prior Publication Data
US 2018/0306014 A1 Oct. 25, 2018

(51) Int. Cl.
*E21B 43/267* (2006.01)
*C09K 8/66* (2006.01)
(Continued)

(52) U.S. Cl.
CPC .............. *E21B 43/267* (2013.01); *C09K 8/66* (2013.01); *C09K 8/685* (2013.01); *C09K 8/80* (2013.01)

(58) Field of Classification Search
CPC ......... E21B 43/267; C09K 8/66; C09K 8/685; C09K 8/80
See application file for complete search history.

(56) References Cited

U.S. PATENT DOCUMENTS

| | | |
|---|---|---|
| 4,029,149 A | 6/1977 | Perkins |
| 4,391,646 A | 7/1983 | Howell |
| (Continued) | | |

FOREIGN PATENT DOCUMENTS

| | | |
|---|---|---|
| EP | 0091555 A1 | 10/1983 |
| WO | WO-2015102629 A1 | 7/2015 |
| (Continued) | | |

OTHER PUBLICATIONS

International Search Report and Written Opinion from PCT/US2015/056873, dated Jul. 21, 2016, 10 pages.

*Primary Examiner* — Crystal J Miller
(74) *Attorney, Agent, or Firm* — McGuireWoods LLP

(57) ABSTRACT

Methods including introducing a solids-free high-viscosity fracturing fluid into a subterranean formation above the fracture gradient to create or enhance at least one dominate fracture. Introducing a first low-viscosity pad fluid (LV-PadF) above the fracture gradient to create or enhance at least one first microfracture extending from the dominate fracture. The first LVPadF comprises an aqueous base fluid, high-density micro-proppants (HDMPs), and low-density micro-beads (LDMBs), the HDMPs having a specific gravity that is at least about 100% greater than the specific gravity of the LDMBs. Placing at least a portion of the HDMPs and LDMBs into the microfracture to form at least a partial monolayer. Introducing a low-viscosity proppant fluid (LVPropF) into the subterranean formation above the fracture gradient. The LVPropF comprises an aqueous base
(Continued)

fluid and medium-sized proppants (MSPs). Placing at least a portion of the MSPs into the dominate fracture.

18 Claims, 1 Drawing Sheet

(51) Int. Cl.
    *C09K 8/68*     (2006.01)
    *C09K 8/80*     (2006.01)

(56) References Cited

U.S. PATENT DOCUMENTS

| | | |
|---|---|---|
| 4,493,875 A | 1/1985 | Beck et al. |
| 6,983,797 B2 | 1/2006 | Nguyen et al. |
| 7,708,069 B2 | 5/2010 | Watters et al. |
| 7,767,629 B2 | 8/2010 | Shinbach et al. |
| 7,845,409 B2 | 12/2010 | Shinbach et al. |
| 8,789,596 B2 | 7/2014 | Curtis et al. |
| 8,985,213 B2 | 3/2015 | Saini et al. |
| 2008/0032898 A1* | 2/2008 | Brannon .................. C09K 8/62 507/100 |
| 2011/0272159 A1 | 11/2011 | Osiptsov et al. |
| 2013/0284437 A1* | 10/2013 | Nguyen ................ E21B 43/267 166/280.1 |
| 2014/0060826 A1* | 3/2014 | Nguyen ................ E21B 43/267 166/280.1 |
| 2014/0251626 A1* | 9/2014 | Gomaa ................... C09K 8/62 166/308.5 |
| 2014/0299326 A1 | 10/2014 | Crews |
| 2017/0190960 A1* | 7/2017 | Tang ..................... E21B 43/267 |

FOREIGN PATENT DOCUMENTS

| | | |
|---|---|---|
| WO | WO-2017/052522 A1 | 3/2017 |
| WO | WO-2017/052524 A1 | 3/2017 |
| WO | WO-2017/052525 A1 | 3/2017 |
| WO | WO-2017/052527 A1 | 3/2017 |
| WO | WO-2017/052529 A1 | 3/2017 |

* cited by examiner

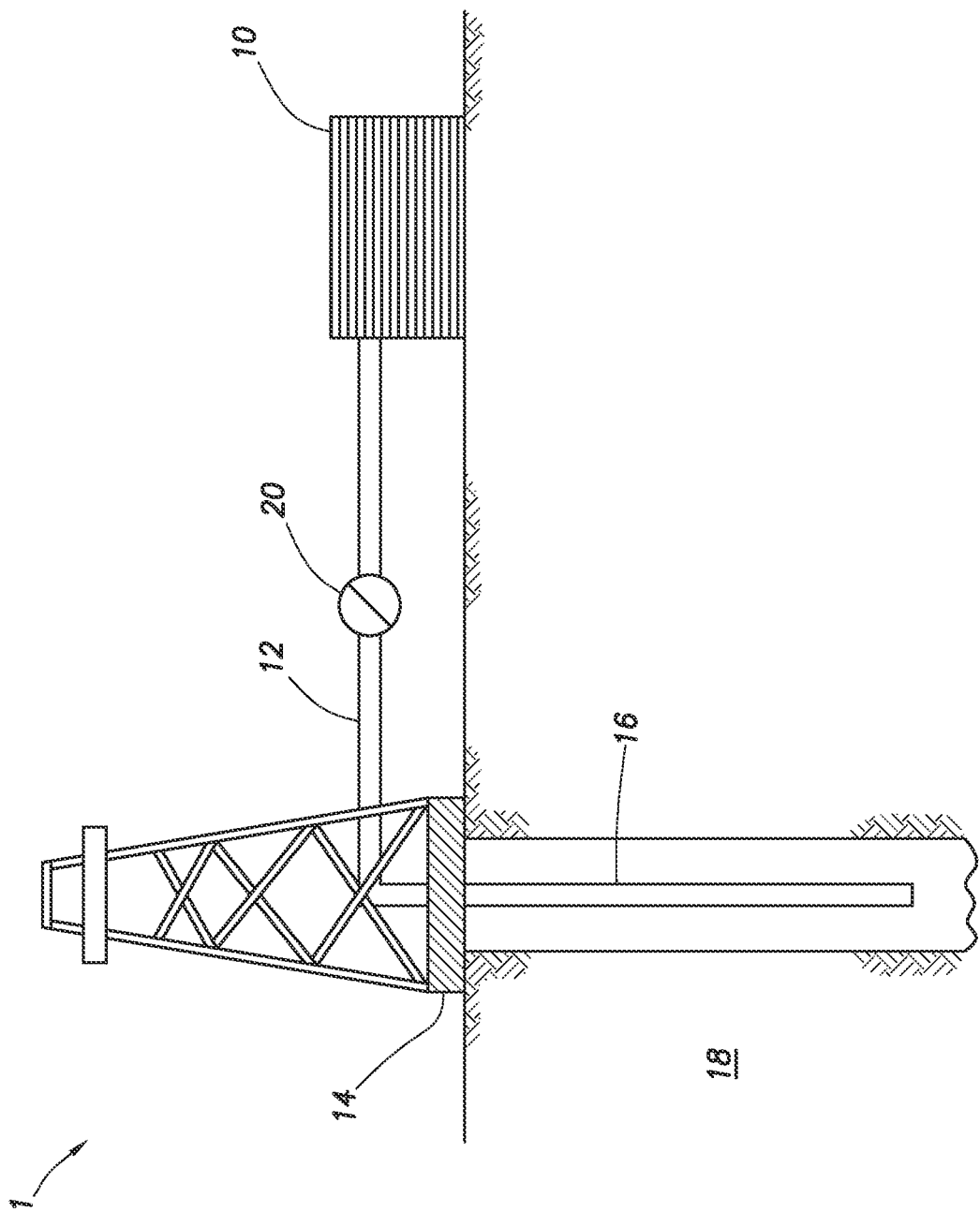

ENHANCING PROPPED COMPLEX FRACTURE NETWORKS IN SUBTERRANEAN FORMATIONS

BACKGROUND

The embodiments herein relate generally to subterranean formation operations and, more particularly, to enhancing propped complex fracture networks in subterranean formations.

Hydrocarbon producing wells (e.g., oil producing wells, gas producing wells, and the like) are often stimulated by hydraulic fracturing treatments. In traditional hydraulic fracturing treatments, a treatment fluid, sometimes called a carrier fluid in cases where the treatment fluid carries particulates entrained therein, is pumped into a portion of a subterranean formation (which may also be referred to herein simply as a "formation") above a fracture gradient sufficient to break down the formation and create one or more fractures therein. The term "treatment fluid," as used herein, refers generally to any fluid that may be used in a subterranean application in conjunction with a desired function and/or for a desired purpose. The term "treatment fluid" does not imply any particular action by the fluid or any component thereof. As used herein, the term "fracture gradient" refers to a pressure (e.g., flow rate) necessary to create or enhance at least one fracture in a subterranean formation.

Typically, particulate solids are suspended in a portion of the treatment fluid and then deposited into the fractures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture." The degree of success of a stimulation operation depends, at least in part, upon the ability of the proppant pack to permit the flow of fluids through the interconnected interstitial spaces between proppant particulates while maintaining open the fracture.

The complexity of a fracture network (or "network complexity") may be enhanced by stimulation operations to create new or enhance (e.g., elongate or widen) existing fractures, which may be interconnected. As used herein, the term "fracture network" refers to the access conduits, either natural or man-made or otherwise, within a subterranean formation that are in fluid communication with a wellbore. The "complexity" of a fracture network refers to the amount of access conduits, man-made or otherwise, within a subterranean formation that are in fluid communication with a wellbore; the greater the amount of access conduits, the greater the complexity. A fracture network with enhanced complexity may increase the amount of produced fluids that may be recovered from a particular subterranean formation.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering various treatment fluids of the embodiments described herein to a downhole location, according to one or more embodiments of the present disclosure.

DETAILED DESCRIPTION

The embodiments herein relate generally to subterranean formation operations and, more particularly, to enhancing propped complex fracture networks in subterranean formations.

The embodiments of the present disclosure provide for enhanced micro-particulate (including high-density micro-proppants and low-density micro-beads, as described in greater detail below) placement in microfractures created in complex fracture networks, including in both the near-wellbore and far-field regions thereof, using a plurality of fluid stages and diversion techniques. As used herein, the term "near-wellbore region," and grammatical variants thereof (e.g., "near-wellbore," and the like), refers to an annular volume of a subterranean formation penetrated by wellbore from the outer diameter of the wellbore extending radially inward along a main fracture from the wellbore and into the formation a distance of no greater than about 10 meters (33 feet). As used herein, the term "far-field region," and grammatical variants thereof (e.g., "far-field," and the like), refers to an annular volume of a subterranean formation penetrated by wellbore from the outer diameter of the wellbore extending radially inward along a main fracture beyond the near-wellbore region, or along a branch fracture. In some instances, the far-field region may be beyond the main fracture tip into the subterranean formation, the main fracture tip being the portion of the main fracture that permits growth of the main fracture.

Traditional micro-proppant may have a specific gravity of about 2.6, which may settle out of a static fluid introduced into a formation, particularly when such static fluid is a low-viscosity fluid (e.g., an LVPadF), such as linear or slickwater fluids, despite their small size. As used herein, the term "linear fluid," and grammatical variants thereof, refers to a low-viscosity fluid that may, though need not, include a gelling agent, but does not include a crosslinking agent. The term "slickwater fluid," and grammatical variants thereof, refers to a low-viscosity linear fluid further comprising a friction reducing agent, such as polyacrylamide, to increase the flow of the fluid. Accordingly, a tendency for such micro-proppants having similar specific gravities to cause incomplete vertical distribution or coverage within a particular fracture may result, which can lead to unpropped areas or sub-optimal propped areas that can actually close after ceasing fluid injection (e.g., after removing hydraulic pressure).

The present disclosure enhances the distribution of micro-particulates within microfractures of a complex fracture network by synergistically combining high-density micro-proppants (HDMPs) and low-density micro-beads (LDMBs), and enhancing hydrocarbon production in both near-wellbore and far-field regions. As used herein, the term "micro-particulate," and grammatical variants thereof, refers to the either one or the combination of HDMPs and LDMBs. The combination of HDMPs and LDMBs in the low-viscosity pad fluids (LVPadF) described herein enhances the transport of the micro-particulates, while additionally enhancing the vertical and longitudinal distribution and coverage of such micro-particulates in created complex fracture networks using the methods of the present disclosure, including small microfractures therein. The LDMBs operate to maintain the HDMPs in suspension in the LDPadFs by overcoming the settling effect of such HDMPs. Moreover, the dual-density micro-particulates permits a larger breadth (i.e., length and width) of created fractures to be propped, as when the LVPadF becomes static in a particular fracture, the HDMPs tend to settle toward a bottom portion of the fracture (e.g., dominate fractures, microfractures, and other created fractures in a complex fracture network, as described in greater detail below) and the LDMBs tend to reside above the HDMPs, including in areas at the top of the fracture, depending on the size thereof. Accordingly, the dual-density micro-proppants, as described according to the present disclosure, are more effective at keeping certain fractures open and conductive compared to traditional micro-sized proppant, thereby allowing better productivity of wellbores formed in varying subterranean formation types, including low permeability formations.

Advantages of the present disclosure include the use of a plurality of fluid stages that specifically allow creation or extension of a dominate fracture and microfractures extending therefrom at one or both of the near-wellbore region and/or the far-field region of a main fracture, in combination with HDMPs and LDMBs during particular fluid stages, thereby enhancing fracture network complexity and hydrocarbon production. As used herein, the term "dominate fracture," and grammatical variants thereof, refers to a primary fracture extending from a wellbore. A "microfracture," and grammatical variants thereof, as used herein, refers to any fracture extending from a dominate fracture or extending from any non-dominate fracture (e.g., a secondary fracture, a tertiary fracture, and the like) extending from a main fracture, and having a flow channel width or flow opening size less than that of the dominate fracture or non-dominate fracture extending therefrom, and in the range of from about 1 μm to about 100 μm, encompassing any value and subset therebetween. The microfractures and macrofractures may be cracks, slots, channels, perforations, holes, or any other ablation within the formation. As used herein and with the embodiments of the present disclosure, the wellbore may be vertical, horizontal, or deviated (neither vertical, nor horizontal), without departing from the scope of the present disclosure.

The use of the plurality of fluids described herein further allows at least partial separation of the formation of the dominate fracture and the formation of one or more microfractures, such that the dominate fracture can continue to grow in length as microfractures are created or extended therefrom. That is, the dominate fracture growth is not stunted due to leakoff in the non-length direction to form the microfractures using the methods described in the present disclosure. As used herein, the term "leakoff" refers to the tendency of fluid to be forced into a formation (e.g., due to a magnitude of pressure exerted on the formation such as during fluid introduction). Additionally, stress shadowing reduces the width of the dominate fracture, further encouraging growth thereof in length.

Multistage fracturing may also be utilized with the embodiments of the present disclosure to further enhance fracture complexity, and thus the hydrocarbons produced therefrom. As used herein, the term "multistage fracturing treatments," and grammatical variants thereof (e.g., "multistage fracturing," "multistage fracturing operations," and the like), refers to a subterranean formation operation in which a plurality of reservoir intervals, or a plurality of locations within one or more reservoir intervals, in the subterranean formation are stimulated in succession, including dominate and microfractures. Examples of multistage fracturing treatments may include, but are not limited to, plug-and-perf operations, dissolvable plug-and-perf operations, continuous stimulation operations, and the like, and any combination thereof. For example, in some multistage fracturing treatments, a first fracture may be formed at a reservoir interval, followed by at least a second fracture formed at the same or a different reservoir interval in a subterranean formation. In some instances, multistage fracturing may involve fracturing a section of a reservoir interval, followed by plugging the fracture such that a treatment fluid may be diverted to a different location in the same reservoir interval or a different reservoir interval for forming a second fracture. The second fracture may then be plugged and the process repeated until the desired number of fractures are formed.

Accordingly, the embodiments of the present disclosure further permit creation of multiple dominate fractures within a single set of perforation clusters or slot clusters, which can further have microfractures that may or may not interconnect in the near-wellbore or far-field regions to further enhance fracture network complexity. As used herein, the term "perforation," and grammatical variants thereof, refers to a communication tunnel into a subterranean formation through which oil or gas is produced into a wellbore. A perforation may be made in a wellbore itself, or through casing or liner, which may or may not be cemented. The term "slot," and grammatical variants thereof, as used herein, refers to a type of perforation that has a slot shape, such that it has a narrow opening (e.g., rectangular in shape, and the like). Such perforations, slots, clusters of perforations, or clusters of slots are encompassed in the term "treatment interval," as used herein. Accordingly, a treatment interval may be a single perforation, a cluster of perforations, a single slot, or a cluster of slots.

Other subterranean formation operations that may utilize the embodiments described herein may include, but are not limited to, re-fracturing operations (e.g., to add newly optimized perforated zones and initiate dominate fracture geometry), remedial treatments, completion operations, and the like, without departing from the scope of the present disclosure.

In some embodiments, the complex fracture network enhancement methods and systems described herein may be utilized in traditional subterranean formations or in low-permeability subterranean formations, such as shale formations, tight-gas formations, and the like (collectively referred to simply as "subterranean formations" or "formations"). The permeability of a formation is a measure of the formation's resistance to through-flow fluid. Thus, low-permeability formations require considerable applied pressure in order to flow fluid through its pore spaces, as compared to formations having higher permeabilities. As used herein, the term "low-permeability formation," and grammatical variants thereof, refers to a formation that has a matrix permeability of less than 1,000 microdarcy (equivalent to 1 millidarcy). As used herein, the term "low-permeability formation" encompasses "ultra-low permeability formations," and grammatical variants thereof, which refers to a formation that has a matrix permeability of less than 1 microdarcy (equivalent to 0.001 millidarcy).

Examples of low-permeability formations may include, but are not limited to, shale reservoirs and tight-gas sands. Shale reservoirs are sources of hydrocarbons comprising complex, heterogeneous rock with low permeability. Shale reservoirs may have permeabilities as low as less than about 0.001 millidarcy ("mD") ($9.869233 \times 10^{-19}$ m$^2$), and even as low as less than about 0.0001 mD ($9.869233 \times 10^{-20}$ m$^2$). An example of such a shale reservoir is the Eagle Ford Formation in South Tex., U.S.A. Tight-gas sands are low permeability formations that produce mainly dry natural gas and may include tight-gas carbonates, tight-gas shales, coal-bed methane, tight sandstones, and the like. Tight-gas sands may have permeabilities as low as less than about 1 mD ($9.869233 \times 10^{-16}$ m$^2$), and even as low as less than about 0.01 mD ($9.869233 \times 10^{-18}$ m$^2$).

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures herein, the upward direction being toward the top of the corresponding figure and the downward direction being toward the bottom of the corresponding figure, the uphole direction being toward the surface of the well and the downhole direction being toward the toe of the well. Additionally, the embodiments depicted in the figures herein are not necessarily to scale and certain features are shown in schematic form only or are exaggerated or minimized in scale in the interest of clarity.

In some embodiments described herein, a plurality of fluid types are utilized, particularly with reference to viscosity, as well as micro-particulate combinations, particularly with reference to density, to enhance fracture network complexity. High-viscosity fluids are used in the embodiments herein to induce dominate fractures in the maximum stress direction of a formation, even if pre-existing fractures crossing the maximum stress direction exist. Such high-viscosity fluids may generate thick and planar dominate fractures with few microfractures extending therefrom, whereas low-viscosity fluids (e.g., slickwater, linear gel, and the like) generate narrow microfractures.

The embodiments described herein disclose the combination of HDMPs and LDMBs to create a bimodal density distribution of micro-particulates capable of propping open microfractures and, in some cases, portions of dominate fractures. The presence of the LDMBs aids in their suspension and further positively interferes with the settling of the HDMPs such that their vertical distribution and longitudinal coverage throughout microfractures (or dominate fractures) is enhanced. With decreased settling tendency, the micro-particulates can be more effectively in combination transported into the fractures, including in the far-field region of a complex fracture network, thereby enhancing the total volume of propped areas therein. As stated above, the HDMPs are able to occupy a bottom portion of a microfracture (or dominate fracture), while the LDMBs are able to occupy to top portion of a microfracture (or dominate fracture, as well) above the bottom portion occupied by the HDMPs, thereby aiding in providing a more uniform micro-particulate distribution over the height of fracture.

In one embodiment, the present disclosure provides a method of introducing a solids-free high-viscosity fracturing fluid (SFHVFF) into a subterranean formation. The SFHVFF is introduced into the formation above the fracture gradient thereof to create or enhance at least one dominate fracture therein. As used herein, the term "solids-free" with reference to the SFHVFF means that no solid particulates are intentionally introduced into the SFHVFF; it does not preclude solid particulates from entering into the SFHVFF as it traverses the formation (e.g., formation fines, and the like). The SFHVFF described herein comprises an aqueous base fluid, which as discussed in detail below, may be any of the aqueous base fluids included in one or more of the low-viscosity fluids of the present disclosure. The SFHVFF may further comprise a gelling agent, a crosslinking agent, and/or an additional additive, each described below.

The viscosity of the SFHVFF is in the range of about 250 centipoise (cP) to about 5000 cP, encompassing any value and subset therebetween. For example, the viscosity of the SFHVFF may be in the range of about 250 cP to about 1000 cP, or about 1000 cP to about 2000 cP, or about 2000 cP to about 3000 cP, or about 3000 cP to about 4000 cP, or about 4000 cP to about 5000 cP, or about 500 cP to about 4500 cP, or about 1000 cP to about 4000 cP, or about 1500 cP to about 3500 cP, or about 2000 cP to about 3000 cP, encompassing any value and subset therebetween. Each of these values is critical to the embodiments of the present disclosure and depend on a number of factors including, but not limited to, the type of subterranean formation being treated, the type of subterranean formation operation being performed, the composition of the SFHVFF, and the like, and combinations thereof.

In some embodiments, to further enhance the generation of the at least one dominate with the SFHVFF, a plurality of incrementally increased fracturing rate steps (IIFRS) may be applied to the SFHVFF until the fracture gradient is reached. The "rate" of the IIFRSs refers to the magnitude of the pressure applied, and the "steps" of the IIFRSs refers to the increase in pressure applied.

After the SFVFF is introduced, a first low-viscosity pad fluid (LVPadF) is then introduced into the subterranean formation above the fracture gradient to create or enhance at least one first microfracture extending from the at least one dominate fracture. Accordingly, the introduction of the first LVPadF may result in a plurality (i.e., two or more) of microfractures extending from the at least one dominate fracture, or a plurality of microfractures extending from multiple dominate fractures, without departing from the scope of the present disclosure.

The first LVPadF comprises a first aqueous base fluid, first HDMPs, and first LDMBs. The specific gravity of the first HDMPs in the first LVPadF is at least about 100% greater than the specific gravity of the first LDMBs. As used herein, the term "specific gravity" means the ratio of the density of a substance or particulate to the density of water. At least a portion of the first HDMPs and the first LDMBs are placed into the at least one first microfracture to create at least a partial monolayer therein. As used herein, the term "at least a portion" with reference to placing the first HDMPs and the first LDMBs of the first LVPadF into the at least one first microfracture means that greater than about 70% of the first HDMPs and the first LDMBs are placed within the at least one first microfracture at any location therein.

Accordingly, the first HDMPs and the first LDMBs may form a partial monolayer or a partial multilayer (a partial multilayer being greater than the "at least" partial monolayer) in the at least first microfracture, without departing from the scope of the present disclosure. As defined herein, the term "partial monolayer" refers to a type of proppant pack in which micro-particulates (i.e., the combination of HDMPs and LDMBs) are capable of holding a fracture open, wherein the separation between any one point of the fracture faces may be less than, or about the same, as the largest exterior dimension of any one of the micro-particulates. As used herein, the term "partial multilayer" refers to a type of proppant pack in which micro-particulates (i.e., the combination of HDMPs and LDMBs) are capable of holding a fracture open, wherein the separation between any one point of the fracture faces may be more than the largest exterior dimension of any one of the micro-particulates. In a partial monolayer and/or partial multilayer, the micro-particulates may be spaced closely or widely apart.

During introduction of the first LVPadF above the fracture gradient, enhances the generation of the at least one first microfracture. Moreover, the combination of the first HDMPs and the first LDMBs enhances propping (i.e., by forming partial monolayers or partial multilayers therein) in the near-wellbore region in particular. The dual-density micro-particulates form pack in the near-wellbore region of the at least one first microfracture (or other microfractures), sealing off the pressure dependent leakoff thereat, which can result in competing fissures or other undesirable fractures in the near-wellbore region. Thus, the first LVPadF comprising the dual-density micro-particulates increases the fluid efficiency in the dominate fracture for further extension thereof, while maintaining productive potential of the created and propped (i.e., by partial monolayer or multilayer) near-wellbore regions of the at least one first microfracture. Of course, some of the first HDMPs and the first LDMBs may traverse the near-wellbore region into deeper areas of the at least one first microfracture, including some into the far-field region thereof, without departing from the scope of the present disclosure.

After forming at least a partial monolayer in the at least one first microfracture with the first HDMPs and the second LDMBs, a low-viscosity proppant fluid (LVPropF) comprising a second aqueous base fluid, medium-sized proppant (MSPs) is then introduced into the subterranean formation above the fracture gradient. The MSPs are larger in size than the dual-density micro-proppants previously introduced in the first LVPadF. At least a portion of the MSPs are placed into a near-wellbore region of at least the one first microfracture and the at least one dominate fracture. That is, the MSPs may enter into the at least one first microfracture in the near-wellbore region that is typically larger in size and, thus capable of accepting the MSPs, than the far-field region. The MSPs further enter the dominate fracture, which is larger in size than the microfractures, and are thus propped open with the MSPs (e.g., form a proppant pack).

As used herein, the term "at least a portion of the MSPs" with reference to their placement in the at least one first microfracture and the at least one dominate fracture means that greater than about 70% of the MSPs enter into these fractures, and does not limit the percentage thereof in either of the at least one first microfracture or the at least one dominate fracture. Accordingly, at least a portion of the MSPs are placed in the near-wellbore region of the at least one first microfracture and additionally in any portion of the at least one dominate fracture. However, because the size of the microfracture and the size of the MSPs may vary, in some instances, a portion of the MSPs may traverse into the at least one first microfracture beyond the near-wellbore region, without departing from the scope of the present disclosure. The inclusion of the MSPs allows secondary LVPadFs, described below, comprising second dual-density micro-particulates to penetrate past the at least one propped dominate fracture (e.g., past the interstitial spaces through the MSPs) and past the near-wellbore region of the at least one first microfracture comprising the MSPs and into the far-field regions of both types of fractures, particularly the microfractures.

Thus, after the LVPropF is introduced into the subterranean formation comprising the MSPs above the fracture gradient, a second LVPadF is introduced into the subterranean formation above the fracture gradient, which further enhances (e.g., lengthens and/or widens) the at least one first microfracture beyond the near-wellbore region. The second LVPadF, like the first LVPadF, comprises a third aqueous base fluid, second HDMPs, and second LDMBs. The specific gravity of the second HDMPs in the second LVPadF is at least about 100% greater than the specific gravity of the second LDMBs therein. At least a portion of the second HDMPs and the second LDMBs are placed into the at least one first microfracture beyond the near-wellbore region thereof.

As used herein, the term "at least a portion" with reference to placing the second HDMPs and the second LDMBs into the at least one fracture beyond the near-wellbore region means that greater than about 70% of the second HDMPs and the second LDMBs are placed beyond the near-wellbore region (i.e., into the far-field region) of the at least one first microfracture. In some embodiments, introduction of the second LVPadF creates or extends at least a second microfracture extending from the at least one dominate fracture, and wherein at least a portion of the second HDMPs and the second LDMBs are placed into the at least one second microfracture. Accordingly, the greater than about 70% of the second HDMPs and the second LDMBs are distributed between the beyond near-wellbore region of the at least one first microfracture and the at least one second microfracture extending from the at least one dominate fracture. In yet other embodiments, the introduction of the second LVPadF creates or extends at least a second microfracture extending from the at least one first microfracture, and wherein at least a portion of the second HDMPs and the second LDMBs are placed into the at least one second microfracture. Accordingly, the greater than about 70% of the second HDMPs and the second LDMBs are distributed between the beyond near-wellbore region of the at least one first microfracture and the at least one second microfracture extending from the at least one first microfracture. In yet other embodiments, introduction of the second LVPadF creates or enhances at least two second microfractures, at least one extending from the at least one dominate fracture and at least one extending from the at least one first microfracture. Thus, the greater than about 70% of the second HDMPs and the second LDMBs are distributed between the beyond near-wellbore region of the at least one first microfracture and the at least two second microfractures.

In some embodiments, to further transport micro-particulates beyond the near-wellbore region (i.e., into the far-field region) of the at least one first microfracture, solely the LDMBs are introduced, which have a low specific gravity for traversing further or deeper into the at least one first microfracture. In such embodiments, a third LVPadF is introduced into the subterranean formation, also above the fracture gradient. The third LVPadF comprises a fourth aqueous base fluid and third LDMBs, and the LDMBs, as previously discussed, are placed beyond the near-wellbore region of the at least one first microfracture.

The combination of the SFHVFF and the first and second LVPadF create a propped complex fracture network. Further inclusion of the third LVPadF can enhance such a propped complex fracture network, particularly in the far-field region of the microfractures (e.g., the at least one first microfracture) of the network beyond the near-wellbore region thereof. Further multi-stage fracturing may also be performed using the methods of the present disclosure. In some embodiments, after the third LVPadF is introduced into the subterranean formation, a diverting treatment fluid (DTF) is introduced into the subterranean formation below the fracture gradient. The DTF comprises a fifth aqueous base fluid and a diverting package, where the diverting package forms a fluidic seal in the mouth of the at least one dominate fracture. As used herein, the term "mouth" of a fracture refers to a portion of the fracture in the near-wellbore region where the fracture originated, and is not limited to a particular length.

The diverting package comprises degradable particulates and non-degradable particulates and is designed to form a fluidic seal such that additional treatment fluids (e.g., another SFHVFF and/or one or more additional LVPadFs) can be introduced into the formation and diverted away from the at least one dominate fracture toward a forming or an already formed different dominate fracture and/or microfracture extending from said different dominate fracture. That is, a second treatment interval in the subterranean formation may be treated, without departing from the scope of the present disclosure. As used herein, the term "fluidic seal," and grammatical variants thereof (e.g., "fluidically seal," and the like), refers to a barrier that is capable of blocking fluid flow such that permeability of the barrier is no more than about 0.01 millidarcies (md) under natural conditions in a subterranean formation or during a subterranean formation operation (e.g., during a multistage fracturing operation as described herein).

In some embodiments, the methods described above of introducing the SFHVFF, first LVPadF, LVPropF, second LVPadF, and third LVPadF, including the placement of HDMPs, LDMPs, and MSPs including therein, may be repeated at least once in the same treatment interval. In other embodiments, the introduction of the SFHVFF, first LVPadF, LVPropF, second LVPadF, and third LVPadF, including the placement of HDMPs, LDMPs, and MSPs including therein, is followed by introduction of the DTF and placement of the diverting package. Thereafter, another round of SFHVFF, first LVPadF, LVPropF, second LVPadF, and third LVPadF, including the placement of HDMPs, LDMPs, and MSPs including therein, may be repeated at least once in a second treatment interval. Such a process may be repeated in whole or in part at the same or additional treatment intervals, without departing from the scope of the present disclosure.

As used below, the term "treatment fluid" encompasses each of the SFHVFF, LVPropF, the first through third LVPadFs, and the DTF for ease of description, unless specified otherwise.

The HDMPs for use in the first and/or second LVPadFs described herein have a specific gravity of greater than about 100% of the LDMBs in the same particular treatment fluid. The type, specific gravity, size, and other characteristics of the one or more particular HDPMs selected for a particular treatment fluid depend on ensuring that the synergistic relationship between them and the present LDMBs as described above is not hindered, such that enhanced transport and distribution throughout a fracture is achieved, thereby enhancing hydrocarbon production.

The specific gravity of the HDMPs are in the range of about 1.75 to about 3.65, encompassing any value and subset therebetween. For example, in some embodiments, the specific gravity of the HDMPs is about 1.75 to about 2.13, or about 2.13 to about 2.51, or about 2.51 to about 2.89, or about 2.89 to about 3.27, or about 3.27 to about 3.65, or about 2.15 to about 3.25, or about 2.55 to about 2.85, encompassing any value and subset therebetween. Each of these values is critical to the embodiments of the present disclosure and depend on a number of factors including, but not limited to, the specific gravity of the LDMBs selected, the type of aqueous base fluid included, any additional additives in the treatment fluid, the location and/or depth of the treatment interval in the subterranean formation, and the like.

The HDMPs have a unit mesh particle size distribution in the range of about 0.01 micrometers ($\mu$m) to about 150 $\mu$m, encompassing any value and subset therebetween. As used herein, the term "unit mesh particle size" or simply "unit mesh size" refers to a size of an object (e.g., a particulate) that is able to pass through a square area having each side thereof equal to the specified numerical value provided herein. Accordingly, the HDMPs may have a unit mesh particle size distribution of about 0.01 $\mu$m to about 30 $\mu$m, or about 30 $\mu$m to about 60 $\mu$m, or about 60 $\mu$m to about 90 $\mu$m, or about 90 $\mu$m to about 120 $\mu$m, or about 120 $\mu$m to about 150 $\mu$m, or about 50 $\mu$m to about 100 $\mu$m, encompassing any value and subset therebetween. In some embodiments, the HDMPs is in the range of about 0.1 $\mu$m to about 100 $\mu$m, encompassing any value and subset therebetween. Each of these values is critical to the embodiments of the present disclosure and depend on a number of factors including, but not limited to, the type of subterranean formation being treated, the size of the dominate and microfractures formed therein, the size of the LDMBs selected, and the like, and any combination thereof.

Accordingly, because the HDMPs are determined based on unit mesh size, the shape of the HDMPs may be of any shape capable of meeting the desired unit mesh size or unit mesh size range. Accordingly, the HDMPs may be substantially spherical, fibrous, or polygonal in shape. As used herein, the term "substantially spherical" refers to a material that has a morphology that includes spherical geometry and elliptic geometry, including oblong spheres, ovoids, ellipsoids, capsules, and the like and may have surface irregularities. As used herein, the term "fibrous," and grammatical variants thereof, refers to fiber-shaped substances having aspect ratios of greater than about 5 to an unlimited upper limit. The term "polygonal," and grammatical variants thereof, as used herein, refers to shapes having at least two straight sides and angles. Examples of polygonal microparticulates may include, but are not limited to, a cube, cone, pyramid, cylinder, rectangular prism, cuboid, triangular prism, icosahedron, dodecahedron, octahedron, pentagonal prism, hexagonal prism, hexagonal pyramid, and the like, and any combination thereof.

In some instances, the HDMPs may have a wider unit mesh size particle distribution than that of the LDMBs in the same treatment fluid (e.g., about 0.1 μm to about 100 μm for the HDMPs, and about 1 μm to about 50 μm for the LDMBs). This wider distribution may enhance the synergistic relationship between the HDMPs and the LDMBs, as discussed above, such as by having smaller LDMBs capable of surrounding the HDMPs to maintain their suspension and overcome the settling effect of the HDMPs.

The crush strength of the HDMPs may be in the range of about 40 pounds per square inch (psi) to about 1800 psi, encompassing any value and subset therebetween. For example, the crush strength of the HDMPs may be in the range of about 40 psi to about 360 psi, or about 360 psi to about 720 psi, or about 720 psi to about 1080 psi, or about 1080 psi to about 1440 psi, or about 1440 psi to about 1800 psi, or about 300 psi to about 1600 psi, or about 500 psi to about 1400 psi, or about 700 psi to about 1200 psi, or about 900 psi to about 1000 psi, encompassing any value and subset therebetween. At least particulate size and wall thickness dictate the crush strength of HDMPs (and the LDMBs discussed below). With small particulate sizes, the number of particulates that are present per unit area can be increased to withstand a stress load. By increasing the wall thickness, higher crush strengths can be achieved. As used herein, the term "crush strength" refers to the greatest compressive strength that a material (e.g., a particulate) can sustain without fracture (i.e., at least a break or a crack). Each of these values is critical to the embodiments of the present disclosure and depend on a number of factors including, but not limited to, the factors stated above, the type of subterranean formation being treated, the type of subterranean formation operation being performed, the amount and type of HDMPs and LDMBs included in the particular treatment fluid, and the like, and any combination thereof.

The HDMPs described herein may be any material meeting the density, size, and crush strength requirements for performing the methods of the present disclosure in a subterranean formation. Examples of suitable HDMPs include, but are not limited to, sand, bauxite, resin coated sand, nut shells encased within resin, ceramic materials, solid glass, and any combination thereof. As used herein, the term "sand" refers to naturally occurring granular material composed of rock and mineral particulates (e.g., desert sand, beach sand). Nut shells may be from any fruit consisting of a hard or tough shell including, but not limited to, pecan, walnut, pine, hazelnut, chestnut, acorn, brazil, candlenut, coconut, cashew, pistachio, and the like, and any combination thereof. The ceramic material may be used as the HDMPs described herein (as well as the LDMBs described below) provided that they meet the density requirements for the HDMPs. The term "ceramic material" includes any inorganic crystalline material, compounded of a metal and a non-metal. Examples of suitable ceramics for use as the HDMPs include, but are not limited to, silicon carbide, cordierite, porcelain, alumina porcelain, high-voltage porcelain, lithia porcelain, cordierite refractory, alumina silica refractory, magnesium silicate, steatite, forsterite, titania, tatanate, and any combination thereof.

Resins for use in forming some of the HDMPs described herein include all resins known in the art that are capable of forming a hardened, consolidated mass. Examples of suitable resins include, but are not limited to, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, silicon-based resins, polyester resins and hybrids and copolymers thereof, polyurethane resins and hybrids and copolymers thereof, acrylate resins, silicon-based resins, and any combination thereof.

An example of a suitable commercially available HDMP for use in the embodiments of the present disclosure include, but are not limited to, ZEEOSPHERES™ N-1000, ceramic microspheres having a specific gravity of about 2.6, available from 3M Company in Saint Paul, Minn.

The HDMPs described herein may be included in the first or second LVPadFs in an amount of from about 1.2 grams per liter (g/L) to about 60 g/L, encompassing any value and subset therebetween. Accordingly, the HDMPs may be present in about 1.2 g/L to about 11 g/L, or about 11 g/L to about 20.8 g/L, or about 20.8 g/L to about 30.6 g/L, or about 30.6 g/L to about 40.4 g/L, or about 40.4 g/L to about 50.2 g/L, or about 50.2 g/L to about 60 g/L, or about 10 g/L to about 50 g/L, or about 20 g/L to about 40 g/L, encompassing any value and subset therebetween. One g/L is equivalent to 0.008336 pounds per gallon. Each of these values is critical to the embodiments of the present disclosure and depend on a number of factors including, but not limited to, the type of subterranean formation, the type of subterranean formation operation, the size of the fractures in the complex fracture network, the type and amount of HDMPs and LDMBs selected, and the like, and any combination thereof.

The LDMBs for use in the first, second and/or third LVPadFs disclosed herein have a specific gravity considerable less than that of the HDMPs, as described above. Like the HDMPs, the type, specific gravity, size, and other characteristics of the one or more particular LDMBs selected for a particular treatment fluid depend on ensuring that the synergistic relationship between them and the present HDMPs as described above is not hindered, such that enhanced transport and distribution throughout a fracture is achieved, thereby enhancing hydrocarbon production.

The specific gravity of the LDMBs are in the range of about 0.3 to about 0.6, encompassing any value and subset therebetween. For example, in some embodiments, the specific gravity of the LDMBs is about 0.3 to about 0.35, or about 0.35 to about 0.4, or about 0.45 to about 0.5, or about 0.5 to about 0.55, or about 0.55 to about 0.6, or about 0.35 to about 0.55, or about 0.4 to about 0.5, encompassing any value and subset therebetween. Each of these values is critical to the embodiments of the present disclosure and depend on a number of factors including, but not limited to, the specific gravity of the HDMPs selected, the type of aqueous base fluid included, any additional additives in the treatment fluid, the location and/or depth of the treatment interval in the subterranean formation, and the like.

Like the HDMPs, the LDMBs may have the same unit mesh size particle distribution, as they are used in concert together to prop portions of complex fracture networks. Thus, the LDMBs have a unit mesh particle size distribution in the range of about 0.01 micrometers (µm) to about 150 µm, encompassing any value and subset therebetween. Accordingly, the HDMPs may have a unit mesh particle size distribution of about 0.01 µm to about 30 µm, or about 30 µm to about 60 µm, or about 60 µm to about 90 µm, or about 90 µm to about 120 µm, or about 120 µm to about 150 µm, or about 50 µm to about 100 µm, encompassing any value and subset therebetween. In some embodiments, the HDMPs is in the range of about 1 µm to about 50 µm, encompassing any value and subset therebetween. Each of these values is critical to the embodiments of the present disclosure and depend on a number of factors including, but not limited to, the type of subterranean formation being treated, the size of the dominate and microfractures formed therein, the size of the HDMPs selected, and the like, and any combination thereof.

Accordingly, and the like HDMPs, the LDMBs are determined based on unit mesh size, and thus the shape of the LDMBs may be of any shape capable of meeting the desired unit mesh size or unit mesh size range. The LDMBs may be substantially spherical, fibrous, or polygonal in shape, as described above.

The crush strength of the LDMBs may be in the range of about 40 psi to about 1800 psi, encompassing any value and subset therebetween. For example, the crush strength of the LDMBs may be about 40 psi to about 350 psi, or about 350 psi to about 700 psi, or about 700 psi to about 1050 psi, or about 1050 psi to about 1400 psi, or about 1400 psi to about 1800 psi, or about 400 psi to about 1400 psi, or about 800 psi to about 1000 psi, encompassing any value and subset therebetween. Each of these values is critical to the embodiments of the present disclosure and depend on a number of factors including, but not limited to, the type of subterranean formation being treated, the type of subterranean formation operation being performed, the amount and type of HDMPs and LDMBs included in the particular treatment fluid, and the like, and any combination thereof.

The high crush strength of the LDMBs is required because such low-density micro-particulates are typically unable to withstand fracture closure stresses during typical subterranean formation operations, such as those described herein. Accordingly, the LDMBs described herein are specifically designed or selected to have specific crush strengths to withstand such fracture closure stresses, whereas other micro-particulates otherwise meeting the size and density requirements described herein for the LDMPs may be unable to withstand such stresses.

The LDMBs described herein may be any material meeting the density, size, and crush strength requirements for performing the methods of the present disclosure in a subterranean formation. Examples of suitable LDMBs include, but are not limited to, polyethylene, polypropylene, polyethylene terephthalate, polymethyl methacrylate, polystyrene, polybutylene, ceramic material, hollow glass, polymeric material, resinous material, Teflon® material, nut shells, seed shells, fruit pits, processed wood, composite materials comprising a binder and a filler material, hollow forms thereof, porous forms thereof, and any combination thereof. The term "hollow," as used herein means having a hole or empty space surrounded by an outside core. As used herein, the term "porous" means having spaces or holes through which liquid or air may pass. That is, to achieve the density of the LDMBs of the present disclosure, the material must, in some instances, be either hollow or porous. The polymeric materials may include any polymers having a specific gravity suitable for use as the LDMBs described herein. Porous or hollow LDMBs may be used to achieve the desired specific gravity when selected base materials forming the LDMBs are greater than the desired specific gravity, for example.

The ceramic materials for use as the LDMBs may be any ceramic material composition or type, including those listed above, regardless of their specific gravity. The ceramic materials may then be made porous or hollow to decrease the specific gravity to comport with the specific gravity requirements of the LDMBs, as described herein. Examples of suitable polymeric materials including those made porous or hollow, include, but are not limited to, nylon, acrylic, polycarbonate, polyurethane, polysulphone, polyetherimide, polyester, polybutene, natural rubber, butyl rubber, polyamide, styrene-butadiene, polyacronitrile, polyvinyl acetate, polychloroprene rubber, polytetrafluoroethylene, and any combination thereof. The nut shells forming the LDMBs may be any of those listed above with reference to the HDMPs, which may be hollow or, more likely, porous to achieve the desired specific gravity. Seed shells may be from any flowering plant's unit of reproduction, examples of which include, but are not limited to, pine, orchid, milkweed, poplar, dandelion, maple, oak, apple, cherry, juniper, sunflower, cereal, legume, cotton, and the like, and any combination thereof.

Fruit pits for forming the LDMBs are the innermost layer of the pericarp that surrounds a seed in a fruit and include any woody fruit pits (i.e., woody endocarps). Examples of suitable fruit pits include, but are not limited to, those from fruits such as peach, cherry, olive, plums, apricots, mango, date, raspberry, and the like, and any combination thereof. The resins for forming the LDMBs described herein may be any resins listed above with reference to the HDMPs for coating sand or encasing nut shells, provided that they alone or in porous or hollow form meet the desired low density of the LDMBs described herein. As used herein, the term "processed wood" refers to ground wood blended with a curable resin and either extruded and/or spun into desirable particulate sizes. The composite materials for forming the LDMBs described herein may be solid, hollow, or porous filler particulates in combination with a binder. Suitable filler materials may include, but are not limited to, include silica, glass, clay, alumina, fumed silica, carbon black, graphite, mica, meta-silicate, calcium silicate, calcine, kaoline, talc, zirconia, titanium dioxide, fly ash, and boron, and combinations thereof. The binder may be any of the resins described above, or non-aqueous tackifying agents, aqueous tackifying agents, emulsified tackifying agents, silyl-modified polyamide compounds, resins, crosslinkable aqueous polymer compositions, polymerizable organic monomer compositions, consolidating agent emulsions, zeta-potential modifying aggregating compositions, silicon-based resins, or any combination thereof. The amount of filler material may be about 0.1% to about 70% by weight of the binder, encompassing any value and subset therebetween, critical to the desired specific gravity of the LDMBs.

An example of a suitable commercially available LDMBs for use in the embodiments described herein may include, but are not limited to, HGS5000, glass bubbles having a specific gravity of about 0.3, available from 3M Company in Saint Paul, Minn.

When included in the first and second LVPadFs described herein with HDMPs, the LDMBs may be present in an amount of about 25% to about 100% of the concentration of the HDMPs (i.e., about 25% to about 100% of 1.2 g/L to about 60 g/L). Accordingly, when included in the first and second LVPadFs, the LDMBs may be present in an amount of from about 0.3 g/L to about 60 g/L, encompassing any value and subset therebetween. In some instances, the LDMBs may be in greater concentration than the HDMPs in order to provide ample suspension properties to maintain the HDMPs in suspension for transport to the desired fracture location at a target interval. Similarly, the LDMBs in the third LVPadF may be included in an identical range. Thus, the LDMBs may be present in a treatment fluid (i.e., first, second, and/or third LVPadF) from about 0.3 g/L to about 10 g/L, or about 10 g/L to about 20 g/L, or about 20 g/L to about 30 g/L, or about 30 g/L to about 40 g/L, or about 40 g/L to about 50 g/L, or about 50 g/L to about 60 g/L, or about 10 g/L to about 50 g/L, or about 20 g/L to about 40 g/L, encompassing any value and subset therebetween. Each of these values is critical to the embodiments of the present disclosure and depend on a number of factors including, but not limited to, the type of subterranean formation, the type of subterranean formation operation, the size of the fractures in the complex fracture network, the type and amount of HDMPs and LDMBs selected, and the like, and any combination thereof.

The MSPs for use in the LVPropF are larger in size than the HDMPs and the LDMBs, but may be composed of any material used for either of the HDMPs and the LDMBs. For example, the MSPs may be composed of materials including, but not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, processed wood, composite particulates comprising a binder and a filler material, and combinations thereof. Similarly, the shape of the MSPs may be substantially spherical, fibrous, or polygonal, without departing from the scope of the present disclosure.

The MSPs have a unit mesh particle size distribution in the range of about 150 µm to about 600 µm, encompassing any value and subset therebetween. For example, the MSPs may have a unit mesh particle size distribution of about 150 µm to about 240 µm, or about 240 µm to about 330 µm, or about 330 µm to about 420 µm, or about 420 µm to about 510 µm, or about 510 µm to about 600 µm, or about 220 µm to about 530 µm, or about 290 µm to about 460 µm, or about 360 µm to about 390 µm, encompassing any value and subset therebetween. Each of these values is critical to the embodiments of the present disclosure and depend on a number of factors including, but not limited to, the type of subterranean formation, the type of subterranean formation operation, the size and shape of the fractures in the formed complex fracture network, the type of MSPs selected, and the like, and any combination thereof.

The MSPs are included in the LVPropF in an amount greater than the HDMPs and the LDMBs in the various LVPadF, because the formation of a proppant pack is desired using the MSPs, whereas partial mono- or multilayers are desired using the HDMPs and the LDMBs, as previously described. Accordingly, the MSPs are included in the LVPropF in an amount in the range of about 60 g/L to about 840 g/L, encompassing any value and subset therebetween. For example, the MSPs may be in the LVPropF of from about 60 g/L to about 216 g/L, or about 216 g/L to about 372 g/L, or about 372 g/L to about 528 g/L, or about 528 g/L to about 684 g/L, or about 684 g/L to about 840 g/L, or about 210 g/L to about 690 g/L, or about 360 g/L to about 540 g/L, encompassing any value and subset therebetween. Each of these values is critical to the embodiments of the present disclosure and depend on a number of factors including, but not limited to, the type of subterranean formation, the size of the fractures in the complex fracture network, the desired porosity of the proppant pack formed with the MSPs, and the like, and any combination thereof. Generally, the MSPs may be present in higher concentrations compared to the HDMPs and/or the LDMBs, whereas the concentration of the HDMPs and/or LDMBs are in lower concentrations to prevent their screen out at the entrance of a microfracture.

The DTF described herein comprises a diverting package including a combination of degradable particulates and non-degradable particulates. The diverting package is capable of forming a fluidic seal in order to divert subsequent treatment fluids to different treatment intervals within a particular subterranean formation or to different openings (i.e., different perforations in a perforation cluster) within the same treatment interval. The degradable particulates in the diverting package can be degraded after the fluidic seal has served its purpose, which may be after a delayed period or any desired period and can be adjusted based on the selected degradable particulates, selected triggers for degradation, conditions of the formation, and the like. After degradation, the fluidic seal is at least partially reversed. As used herein, the term "at least partially reversed" after degradation of the degradable particulates in the diverting package means restoration of greater than about 75% permeability at the location prior to forming the fluidic seal thereat.

The non-degradable particulates may be composed of any material previously discussed with reference to the HDMPs, the LDMBs, and the MSPs. Any degradable particulate suitable for use in a subterranean formation that is able to form a fluidic seal with the non-degradable particulates in the diverting package may be used in accordance with the embodiments described herein. For example, some suitable degradable particulates include, but are not limited to, degradable polymers, dehydrated salts, and any combination thereof. As for degradable polymers, a polymer is considered to be "degradable" herein if the degradation is due to, in situ, a chemical and/or radical process such as hydrolysis, or oxidation.

The degradable polymers may, in some instances be oil-degradable polymers such that during production of hydrocarbons the degradable polymers degrade to remove the fluidic seal, thus allowing the hydrocarbons to be produced to the surface. Examples of such oil-degradable polymers may be natural or synthetic polymers including, but not limited to, polyacrylics, polyamides, polyolefins (e.g., polyethylene, polypropylene, polyisobutylene, polystyrene, and the like), and any combination thereof. Examples of additional degradable polymers include, but are not limited to, polysaccharides (e.g., dextran, cellulose, and the like), chitins, chitosans, proteins, aliphatic polyesters, poly(lactides), poly(glycolides), poly(s-caprolactones), poly(hydroxybutyrates), poly(anhydrides), aliphatic or aromatic polycarbonates, poly(orthoesters), poly(amino acids), poly(ethylene oxides), polyphosphazenes, and any combinations thereof.

Dehydrated salt is suitable for use in the present disclosure if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), anhydrous boric acid, and any combination thereof.

The unit mesh particle size distribution of the non-degradable particulates in the diverting package is in the range of from about 1 μm to about 200 μm, encompassing any value and subset therebetween. For example, the unit mesh particle size distribution of the non-degradable particulates may be from about 1 μm to about 40 μm, or about 40 μm to about 80 μm, or about 80 μm to about 120 μm, or about 120 μm to about 160 μm, or about 160 μm to about 200 μm, encompassing any value and subset therebetween. The unit mesh particle size distribution of the degradable particulates in the diverting package is in the range of from about 0.1 μm to about 200 μm, encompassing any value and subset therebetween. For example, the unit mesh particle size distribution of the degradable particulates may be from about 0.1 μm to about 40 μm, or about 40 μm to about 80 μm, or about 80 μm to about 120 μm, or about 120 μm to about 160 μm, or about 160 μm to about 200 μm, encompassing any value and subset therebetween. The degradable particulates may be smaller in size than the non-degradable particulates in the diverting agent in order to wedge between interstitial spaces of the diverting package forming the fluidic seal and then to thereafter degrade to more efficiently at least partially reverse the fluidic seal. Each of these values is critical to the embodiments of the present disclosure and depend on a number of factors including, but not limited to, the type of subterranean formation, the size of the mouth of the fracture in which the fluidic seal is being formed, the desired permeability reduction, and the like, and any combination thereof. For example, a wide distribution may be desirable to ensure that interstitial spaces between the various particulates in the diverting package are plugged.

The shape of the particulates in the diverting package may be substantially spherical, fibrous, or polygonal, as discussed previously with reference to the HDMPs, the LDMBs, and the MSPs.

The ratio of degradable particulates to non-degradable particulates (degradable particulates:non-degradable particulates) in the DTF described herein is in the range of about 1:10 to about 10:1, encompassing any value and subset therebetween. For example, the ratio of degradable particulates:non-degradable particulates in the DTF may be about 1:10 to about 1:1, or about 1:1 to about 2:1, or about 2:1 to about 4:1, or about 4:1 to about 6:1, or about 6:1 to about 8:1, or about 8:1 to about 10:1, or about 1:1 to about 8:1, or about 4:1 to about 6:1, encompassing any value and subset therebetween. Each of these values is critical to the embodiments of the present disclosure and depends on a number of factors including, but not limited to, the size of the mouth of the fracture where the fluidic seal is being formed, the type of subterranean formation, the type of non-degradable particulates selected, the type of degradable particulates selected, the size and shape of the non-degradable and degradable particulates, selected, and the like.

The diverting package (i.e., the combination of degradable and non-degradable particulates), according to the embodiments described herein, can be included in the DTF in an amount in the range of about 1.2 g/L to about 600 g/L, encompassing any value and subset therebetween. For example, the diverting package may be included in the DTF from about 1.2 g/L to about 50 g/L, or about 50 g/L to about 120 g/L, or about 120 g/L to about 240 g/L, or about 240 g/L to about 360 g/L, 360 g/L to about 480 g/L, or about 480 g/L to about 600 g/L, or about 100 g/L to about 500 g/L, or about 200 g/L to about 400 g/L, encompassing any value and subset therebetween. Each of these values is critical to the embodiments of the present disclosure and depends on a number of factors including, but not limited to, the size of the mouth of the fracture where the fluidic seal is being formed, the type of subterranean formation, the type of non-degradable particulates selected, the type of degradable particulates selected, the size and shape of the non-degradable and degradable particulates, selected, and the like.

Each of the SFHVFF, the LVPropF, the first through third LVPadFs, and the DTF comprise an aqueous base fluid. Each of these treatment fluids may comprise the same or different aqueous base fluids, without departing from the scope of the present disclosure. Accordingly, each of the aqueous base fluids may be different for each treatment fluid, some treatment fluids may comprise the same aqueous base fluid, or all of the treatment fluids may comprise different aqueous base fluids, without departing from the scope of the present disclosure.

Suitable aqueous base fluids for use in the treatment fluids described herein may include, but are not limited to, fresh water, saltwater (e.g., water containing one or more salts dissolved therein), brine (e.g., saturated salt water), seawater, produced water (e.g., water produced as a byproduct from a subterranean formation during hydrocarbon production), waste water (e.g., water that has been adversely affected in quality by anthropogenic influence) that is untreated or treated, and any combination thereof. Generally, the water may be from any source, provided that it does not contain components that might adversely affect the stability and/or performance of the treatment fluids (e.g., the transport and synergistic relationship between the HDMPs and the LDMBs). Suitable aqueous-miscible fluids may, in some embodiments, include, but not be limited to, an alcohol (e.g., methanol, ethanol, n-propanol, isopropanol, n-butanol, sec-butanol, isobutanol, and t-butanol), a glycerin, a glycol (e.g., polyglycols, propylene glycol, and ethylene glycol), a polyglycol amine, a polyol, any derivative thereof, any in combination with a salt (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous base fluid described above, and any combination thereof.

The SFHVFF of the present disclosure is a high-viscosity treatment fluid comprising an aqueous base fluid, as described above, and has a viscosity in the range of from about 100 centipoise (cP) to about 20000 cP at a shear rate of 40 $sec^{-1}$ at room temperature, encompassing any value and subset therebetween. For example, the viscosity of the SFHVFF may be in the range of about 100 cP to about 1000 cP, or about 1000 cP to about 4000 cP, or about 4000 cP to about 8000 cP, or about 8000 cP to about 12000 cP, or about 12000 cP to about 16000 cP, or about 16000 cP to about 20000 cP at a shear rate of 40 $sec^{-1}$ at room temperature, encompassing any value and subset therebetween. Each viscosity value for the SFHVFF is critical to the embodiments of the present disclosure and depend on a number of factors including, but not limited to, the type of base fluid used, the type of subterranean formation being treated, the desired size and length of the dominate fracture to be created or extended, and the like, and any combination thereof. As used herein, the term "room temperature" means a temperature of from about 15° C. to about 25° C., encompassing any value and subset therebetween.

The various low-viscosity treatment fluids described herein (e.g., the first through third LVPadF and the LVPropF) have a viscosity in the range of about 1 cP to about 200 cP at a shear rate of 40 sec$^{-1}$ at room temperature, encompassing any value and subset therebetween. For example, the viscosity of the low-viscosity treatment fluids may be in the range of about 1 cP to about 40 cP, or about 40 cP to about 80 cP, or about 80 cP to about 120 cP, or about 120 cP to about 160 cP, or about 160 cP to about 200 cP at a shear rate of 40 sec$^{-1}$ at room temperature, encompassing any value and subset therebetween. Each viscosity value for the low-viscosity treatment fluids is critical to the embodiments of the present disclosure and depend on a number of factors including, but not limited to, the type of base fluid used, the type of subterranean formation being treated, the desired size and length of the complex fracture network to be created or extended, and the like, and any combination thereof.

The viscosity of the DTF described herein is in the range of about 0.1 cP to about 250 cP, encompassing any value and subset therebetween. For example, the viscosity of the DTF may be about 0.1 cP to about 1 cP, or about 1 cP to about 10 cP, or about 10 cP to about 50 cP, or about 50 cP to about 100 cP, or about 100 cP to about 150 cP, or about 150 cP to about 200 cP, or about 200 cP to about 250 cP, or about 50 cP to about 200 cP, or about 150 cP to about 100 cP, encompassing any value and subset therebetween. Each of these values is critical to the embodiments of the present disclosure and depend on a number of factors including, but not limited to, the composition of the diverting package (e.g., type and amount of degradable and non-degradable particulates), the type of subterranean formation, and the like, and any combination thereof.

In some embodiments, one or more of the treatment fluids described herein may further comprise an additive including, but not limited to, a tackifying agent, a gelling agent, a crosslinker, a salt, a weighting agent, an inert solid, a fluid loss control agent, an emulsifier, a dispersion aid, a corrosion inhibitor, an emulsion thinner, an emulsion thickener, a surfactant, a lost circulation material, a foaming agent, a gas, a pH control additive, a breaker, a biocide, a stabilizer, a chelating agent, a scale inhibitor, a gas hydrate inhibitor, a friction reducer, a clay stabilizing agent, and any combination thereof.

In some embodiments, one or more (including all) of the LVPadFs may further comprise a tackifying agent additive, which may be non-aqueous or aqueous. In preferred embodiments, the tackifying agent is an aqueous tackifying agent for compatibility with selected treatment fluids. The tackifying agent may be included in the LVPadFs of the present disclosure to promote a low degree of adhesion between the HDMPs and LDMBs in combination, and/or cohesion between either one of the micro-particulates alone to further assist in suspending the micro-particulates in the LVPadF. In specific examples, the tackifying agent is in the first and/or second LVPadFs comprising both the HDMPs and the LDMBs, such that the tackifying agent assists the LDMBs in suspending the HDMPs.

The non-aqueous tackifying agents may comprise polyamides that are liquids or in solution at the temperature of the subterranean formation such that they are, by themselves, non-hardening when introduced into the subterranean formation. A particularly preferred product is a condensation reaction product comprised of a polyacid and a polyamine. The non-aqueous tackifying agents may further comprise amounts of dibasic acids containing some trimer and higher oligomers and also small amounts of monomer acids that are reacted with polyamines, without departing from the scope of the present disclosure. Other polyacids for use as the non-aqueous tackifying agents may include, but are not limited to, trimer acids, synthetic acids produced from fatty acids, maleic anhydride, acrylic acid, and the like, and combinations thereof. Additional compounds which may be used as non-aqueous tackifying agents include liquids and solutions of, for example, polyesters, polycarbonates, silyl-modified polyamide compounds, polycarbamates, urethanes, natural resins such as shellac, and the like. Combinations of these may be suitable as well.

Multifunctional materials suitable for use in the present disclosure may include, but are not limited to, an aldehyde (e.g., formaldehyde), a dialdehyde (e.g., glutaraldehyde, hemiacetals or aldehyde releasing compounds), a diacid halide, a dihalide (e.g., dichlorides and dibromides), a polyacid anhydride (e.g., citric acid, epoxides, furfuraldehyde, glutaraldehyde or aldehyde condensates), and any combination thereof. In some embodiments, the multifunctional material may be mixed with the non-aqueous tackifying agent in an amount of from about 0.01% to about 50% by weight of the non-aqueous tackifying agent, encompassing any value and subset therebetween. In other embodiments, the multifunctional material may be mixed with the non-aqueous tackifying agent in an amount of from about 0.5% to about 1% by weight of the non-aqueous tackifying agent.

Suitable aqueous tackifying agents may include any polymer that can bind particulates or formation faces, or coagulate and/or flocculate particulates. Also, polymers that function as pressure-sensitive adhesives may be suitable. Examples of aqueous tackifying agents suitable for use in the embodiments herein may include, but are not limited to, an acrylic acid polymer, an acrylic acid ester polymer, an acrylic acid derivative polymer, an acrylic acid homopolymer, an acrylic acid ester homopolymer (e.g., poly(methyl acrylate), poly(butyl acrylate), poly(2-ethylhexyl acrylate), and the like), an acrylic acid ester co-polymer, a methacrylic acid derivative polymer, a methacrylic acid homopolymer, a methacrylic acid ester homopolymer (e.g., poly(methyl methacrylate), poly(butyl methacrylate), poly(2-ethylhexyl methacrylate), and the like), an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and any combination thereof.

Aqueous tackifying agents may comprise at least one member selected from the group consisting of benzyl coco di-(hydroxyethyl) quaternary amine, p-T-amyl-phenol condensed with formaldehyde, and a copolymer comprising from about 80% to about 100% C1-C30 alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. The term "copolymer," as used herein, is not limited to polymers comprising two types of monomeric units, but includes any combination of monomeric units, e.g., terpolymers, tetrapolymers, and the like.

Suitable hydrophillic monomers may be any monomer that will provide polar oxygen-containing or nitrogen-containing groups. Suitable hydrophillic monomers may include, but are not limited to, dialkyl amino alkyl (meth) acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. Combinations of these may be suitable as well. These copolymers can be made by any suitable emulsion polymerization technique.

An example of a suitable commercially available tackifying agent includes, but is not limited to, SANDWEDGE® ABC aqueous tackifying agent available from Halliburton Energy Services, Inc. in Houston, Tex.

When included, the tackifying agent may be included in the LVPadF in a low concentration amount to achieve the desired suspension qualities. For example, the tackifying agent may be in an amount in the range of about 0.01% to about 1% volume per volume of the liquid portion of the LVPadF, encompassing any value and subset therebetween. For example, the tackifying agent may be included in the LVPadF in an amount of about 0.01% to about 0.1%, or about 0.1% to about 0.2%, or about 0.2% to about 0.4%, or about 0.4% to about 0.6%, or about 0.6% to about 0.8%, or about 0.8% to about 1%, or about 0.2% to about 0.8%, or about 0.4% to about 0.6% each volume per volume of the liquid portion of the LVPadF, encompassing any value and subset therebetween. Each of these values is critical to the embodiments of the present disclosure and may depend on a number of factors including, but not limited to, the type of LVPadF selected, the type of HDMPs selected, the type of LDMBs selected, the location of the treatment interval in the subterranean formation (and thus the duration of suspension required), and the like, and any combination thereof.

In some instances, any one of the treatment fluids described herein may further include a gelling agent for use in achieving the desired viscosity for the particular treatment fluid. Suitable gelling agents may include, but are not limited to, a natural polymer, a synthetic polymer, and any combination thereof. Oligomers, including those listed herein, capable of associating to form higher viscosity networks may also be used as the gelling agents, without departing from the scope of the present disclosure, provided that the particular treatment fluid into which they are included maintains the appropriate viscosity.

Suitable gelling agents may include, but are not limited to, polysaccharides, biopolymers, and/or derivatives thereof that contain one or more of these monosaccharide units: galactose, amylose, mannose, glucoside, glycosaminoglycan, glucose, xylose, arabinose, fructose, glucuronic acid, pyranosyl sulfate, and any combination thereof. Specific examples of suitable polysaccharides may include, but are not limited to, a guar gum (e.g., hydroxyethyl guar, hydroxypropyl guar, carboxymethyl guar, carboxymethylhydroxyethyl guar, carboxymethylhydroxypropyl guar, and the like), a cellulose derivative (e.g., hydroxyethyl cellulose, carboxyethylcellulose, carboxymethylcellulose, carboxymethylhydroxyethylcellulose, and the like), xanthan, scleroglucan, succinoglycan, diutan, and any combination thereof.

Examples of suitable synthetic polymers may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamide and methacrylamidoalkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, any derivatives thereof, and any combination thereof.

In certain embodiments, the gelling agent may comprise an acrylamide/2-(methacryloyloxy)ethyltrimethylammonium methyl sulfate copolymer. In other certain embodiments, the gelling agent may comprise an acrylamide/2-(methacryloyloxy)ethyltrimethylammonium chloride copolymer. In yet other embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the treatment fluids described herein in an amount of from about 0.001% to about 0.5% by weight per volume of the liquid portion of the treatment fluid, encompassing any value and subset therebetween. For example, the gelling agent may be present in an amount of from about 0.001% to about 0.01%, or about 0.01% to about 0.1%, or about 0.1% to about 0.2%, or about 0.2% to about 0.3%, or about 0.3% to about 0.4%, or about 0.4% to about 0.5% each by weight per volume of the liquid portion of the treatment fluid, encompassing any value and subset therebetween. Each of these values is critical to the embodiments described herein and may depend on a number of factors including, but not limited to, the type of treatment fluid into which the gelling agent is included, the type of the desired viscosity of the treatment fluid, the selected base fluid, the type of subterranean formation, and the like, and any combination thereof.

In some embodiments, it may be desirable to crosslink the gelling agent(s) in the treatment fluids to further increase the viscosity thereof, when the treatment fluid is the SFHVFF and/or the DTF. Inclusion of crosslinking agents can achieve increased viscosity due to crosslinking. It should be noted that generally the DTF does not comprise a crosslinking agent, however in some instances where the viscosity must be increased to meet the viscosity ranges described herein, for example, a crosslinking agent may be included, without departing from the scope of the present disclosure. When included in a treatment fluid, the crosslinking agents may include, but are not limited to, a borate ion, a metal ion, or similar component that is capable of crosslinking at least two molecules of the gelling agent. Examples of suitable crosslinking agents may include, but are not limited to, borate ions, magnesium ions, zirconium IV ions, titanium IV ions, aluminum ions, antimony ions, chromium ions, iron ions, copper ions, magnesium ions, zinc ions, and any combination thereof. These ions may be provided by providing any compound that is capable of producing one or more of these ions.

In some embodiments, the crosslinking agent may be a multifunctional boronic acid crosslinking agent comprising a copolymer that comprises at least one boronic acid monomer unit and at least one water-soluble monomer unit. The multifunctional boronic acid crosslinking agent may be a random copolymer. The at least one boronic acid monomer unit may be a polymerizable vinyl, allyl, or acrylic functional group; an aryl, alkyl, alkenyl, or alkynyl boronic acid; and any combination thereof. The at least one water-soluble monomer unit may be selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof. For example, the boronic acid monomer unit may be 3-acrylamidophenyl boronic acid and the water-soluble monomer unit may be an acrylamide (e.g., N,N-dimethylacrylamide). In some embodiments, the ratio of the boronic acid monomer unit(s) to the water-soluble monomer unit(s) is in the range of from about 1:1 to about 1:200, encompassing any value and subset therebetween.

In various embodiments, systems configured for delivering the treatment fluids described herein to a downhole location are described. In various embodiments, the systems can comprise a pump fluidly coupled to a tubular, the tubular containing the treatment fluids described herein. It will be appreciated that while the system described below may be used for delivering any one of the treatment fluids described herein, each treatment fluid is delivered separately into the subterranean formation.

The pump may be a high pressure pump in some embodiments. As used herein, the term "high pressure pump" will refer to a pump that is capable of delivering a treatment fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the micro-sized proppant particulates and/or the micro-sized proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids (i.e., SFHVFF, the LVPadFs, the LVPropF, the DTF) of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid or a portion thereof may, in some embodiments, flow back to wellhead 14 and exit subterranean formation 18. In some embodiments, the treatment fluid that has flowed back to wellhead 14 may subsequently be recovered and recirculated to subterranean formation 18, or otherwise treated for use in a subsequent subterranean operation or for use in another industry.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include:

Embodiment A

A method comprising: (a) introducing a solids-free high-viscosity fracturing fluid (SFHVFF) into a subterranean formation above a fracture gradient to create or enhance at least one dominate fracture in a first treatment interval therein; (b) introducing a first low-viscosity pad fluid (LVPadF) into the subterranean formation above the fracture gradient to create or enhance at least one first microfracture extending from the at least one dominate fracture, wherein the first LVPadF comprises a first aqueous base fluid, first high density micro-proppants (HDMPs), and first low-density micro-beads (LDMBs), and wherein a specific gravity of the first HDMPs is at least about 100% greater than a specific gravity of the first LDMBs; (c) placing at least a portion of the first HDMPs and the first LDMBs into the at least one first microfracture to create at least a partial monolayer therein; (d) introducing a first low-viscosity proppant fluid (LVPropF) into the subterranean formation above the fracture gradient, wherein the first LVPropF comprises a second aqueous base fluid, first medium-sized proppants (MSPs) having a unit mesh size in the range of about 150 micrometers to about 600 micrometers; and (e) placing at least a portion of the first MSPs into the at least one dominate fracture.

Embodiment A may have one or more of the following additional elements in any combination:

Element A1: Further comprising applying incrementally increased fracturing rate steps to the first SFHVFF.

Element A2: Wherein the specific gravity of the first HDMPs is in the range of about 1.75 to about 3.65, and the specific gravity of the first LDMBs is in the range of about 0.3 to about 0.6.

Element A3: Wherein the first HDMPs and the first LDMBs placed into the at least one first microfracture in step (c) create at least a partial multilayer therein.

Element A4: Wherein the first HDMPs have a unit mesh size in the range of about 0.01 micrometers to about 150 micrometers, and wherein the first LDMBs have a unit mesh size in the range of about 0.01 micrometers to about 150 micrometers.

Element A5: Wherein the at least one first microfracture is formed in a far-field and/or the near-wellbore region of the subterranean formation.

Element A6: Wherein a plurality of first microfractures is formed in either or both of the far-field region and/or the near-wellbore region of the subterranean formation.

Element A7: Wherein the MSPs in the first LVProp fluid are placed in the far-field region of the dominate fracture.

Element A8: Wherein the first HDMPs are present in a concentration of about 1.2 grams per liter to about 60 grams per liter of the first LVPadF, and wherein the first LDMBs are present in a concentration of about 25% to about 100% of the concentration of the first HDMPs in the first LVPadF.

Element A9: Wherein the first LVPadF further comprises a tackifying agent in a concentration in the range of about 0.01% to about 1% volume per volume of a liquid portion of the first LVPadF.

Element A10: Further comprising a tubular extending from a wellhead and into the subterranean formation, and a pump fluidly coupled to the tubular, the tubular containing a fluid selected from the group consisting of the SFHVFF, the first LVPadF, the first PVPropF, and any combination thereof.

Element A11: Further comprising: (f) introducing a second LVPadF into the subterranean formation above the fracture gradient, wherein the second LVPadF comprises a third aqueous base fluid, second HDMPs, and second LDMBs, and wherein a specific gravity of the second HDMPs is at least about 100% greater than a specific gravity of the second LDMBs; and (g) placing at least a portion of the second HDMPs and the second LDMBs into the at least one first microfracture and/or the dominate fracture.

Element A12: Further comprising: (f) introducing a second LVPadF into the subterranean formation above the fracture gradient, wherein the second LVPadF comprises a third aqueous base fluid, second HDMPs, and second LDMBs, and wherein a specific gravity of the second HDMPs is at least about 100% greater than a specific gravity of the second LDMBs; and (g) placing at least a portion of the second HDMPs and the second LDMBs into the at least one first microfracture and/or the dominate fracture, wherein the second LVPadF further creates or enhances at least one second microfracture selected from the group consisting of: at least one second microfracture extending from the at least one dominate fracture, and wherein at least a portion of the second HDMPs and the second LDMBs are placed into the at least one second microfracture extending from the at least one dominate fracture, at least one second microfracture extending from the at least one first microfracture, and wherein at least a portion of the second HDMPs and the second LDMBs are placed into the at least one second microfracture extending from the at least one dominate fracture, and any combination thereof.

Element A13: Further comprising: (f) introducing a second LVPadF into the subterranean formation above the fracture gradient, wherein the second LVPadF comprises a third aqueous base fluid, and second LDMBs, and wherein a specific gravity of the second LDMBs is in the range of about 0.3 to about 0.6 and a unit mesh size in the range of about 0.01 micrometers to about 150 micrometers; and (g) placing the third LDMBs into the at least one first microfracture and/or into the far-field region of the dominate fracture.

Element A14: Further comprising: (f) introducing a second LVPadF into the subterranean formation above the fracture gradient, wherein the second LVPadF comprises a third aqueous base fluid, and second LDMBs, and wherein a specific gravity of the second LDMBs is in the range of about 0.3 to about 0.6 and a unit mesh size in the range of about 0.01 micrometers to about 150 micrometers; and (g) placing the third LDMBs into the at least one first microfracture and/or into the far-field region of the dominate fracture, wherein the second LVPadF further creates or enhances at least one second microfracture selected from the group consisting of: at least one second microfracture extending from the at least one dominate fracture, and wherein at least a portion of the second HDMPs and the second LDMBs are placed into the at least one second microfracture extending from the at least one dominate fracture, at least one second microfracture extending from the at least one first microfracture, and wherein at least a portion of the second HDMPs and the second LDMBs are placed into the at least one second microfracture extending from the at least one dominate fracture, and any combination thereof.

Element A15: Further comprising: (f) introducing a second LVPadF into the subterranean formation above the fracture gradient, wherein the second LVPadF comprises a third aqueous base fluid, and second LDMBs, and wherein a specific gravity of the second LDMBs is in the range of about 0.3 to about 0.6 and a unit mesh size in the range of about 0.01 micrometers to about 150 micrometers, and wherein the second LDMBs are present in a concentration of about 0.3 grams per liter to about 60 grams per liter of the second LVPadF; and (g) placing the third LDMBs into the at least one first microfracture and/or into the far-field region of the dominate fracture.

Element A16: Further comprising: (f) introducing a second LVPadF into the subterranean formation above the fracture gradient, wherein the second LVPadF comprises a third aqueous base fluid, second HDMPs, and second LDMBs, and wherein a specific gravity of the second HDMPs is at least about 100% greater than a specific gravity of the second LDMBs; (g) placing at least a portion of the second HDMPs and the second LDMBs into the at least one first microfracture and/or into the far-field region of the dominate fracture; (h) introducing a second LVPropF into the subterranean formation above the fracture gradient, wherein the second LVPropF comprises a fourth aqueous base fluid, second MSPs having a unit mesh size in the range of about 150 micrometers to about 600 micrometers; and (i) placing the MSPs and/or CSPs in the dominate fracture.

Element A17: Further comprising: (f) introducing a second LVPadF into the subterranean formation above the fracture gradient, wherein the second LVPadF comprises a third aqueous base fluid, second HDMPs, and second LDMBs, and wherein a specific gravity of the second HDMPs is at least about 100% greater than a specific gravity of the second LDMBs; (g) placing at least a portion of the second HDMPs and the second LDMBs into the at least one first microfracture and/or into the far-field region of the dominate fracture; (h) introducing a second LVPropF into the subterranean formation above the fracture gradient, wherein the second LVPropF comprises a fourth aqueous base fluid, second MSPs having a unit mesh size in the range of about 150 micrometers to about 600 micrometers; and (i) placing the MSPs and/or CSPs in the dominate fracture, and wherein the MSPs and/or CSPs in the second LVPropF are placed in the near-wellbore region of the dominate fracture.

By way of non-limiting example, exemplary combinations applicable to A include: A1-A17; A1, A3, and A9; A3, A5, A6, and A17; A14 and A16; A3, A6, A15, and A17; A7 and A8; A4, A8, A10, and A11; A12, A14, and A16; A13 and A14; A2, A5, and A13; and the like.

Embodiment B

A method comprising: (a) introducing a solids-free high-viscosity fracturing fluid (SFHVFF) into a subterranean formation above a fracture gradient to create or enhance at least one dominate fracture in a first treatment interval therein; (b) introducing a first low-viscosity pad fluid (LV-PadF) into the subterranean formation above the fracture gradient to create or enhance at least one first microfracture extending from the at least one dominate fracture, wherein the first LVPadF comprises a first aqueous base fluid, first high density micro-proppants (HDMPs), and first low-density micro-beads (LDMBs), and wherein a specific gravity of the first HDMPs is at least about 100% greater than a specific gravity of the first LDMBs; (c) placing at least a portion of the first HDMPs and the first LDMBs into the at least one first microfracture to create at least a partial monolayer therein; (d) introducing low-viscosity proppant fluid (LVPropF) into the subterranean formation above the fracture gradient, wherein the LVPropF comprises a second aqueous base fluid, medium-sized proppants (MSPs) having a unit mesh size in the range of about 150 micrometers to about 600 micrometers; (e) placing at least a portion of the MSPs into the at least one dominate fracture; (f) introducing a diverting treatment fluid (DTF) into the subterranean formation below the fracture gradient, wherein the DTF comprises a third aqueous base fluid and a diverting package, the diverting package comprising degradable particulates and non-degradable particulates; and (g) placing the diverting package into a mouth of the at least one dominate fracture.

Embodiment B may have one or more of the following additional elements in any combination:

Element B1: Further comprising applying incrementally increased fracturing rate steps to the first SFHVFF.

Element B2: Wherein the specific gravity of the first HDMPs is in the range of about 1.75 to about 3.65, and the specific gravity of the first LDMBs is in the range of about 0.3 to about 0.6.

Element B3: Wherein the first HDMPs and the first LDMBs placed into the at least one first microfracture in step (c) create at least a partial multilayer therein.

Element B4: Wherein the first HDMPs have a unit mesh size in the range of about 0.01 micrometers to about 150 micrometers, and wherein the first LDMBs have a unit mesh size in the range of about 0.01 micrometers to about 150 micrometers.

Element B5: Wherein the at least one first microfracture is formed in a far-field and/or the near-wellbore region of the subterranean formation.

Element B6: Wherein a plurality of first microfractures is formed in either or both of the far-field region and/or the near-wellbore region of the subterranean formation.

Element B7: Wherein the MSPs in the first LVProp fluid are placed in the far-field region of the dominate fracture.

Element B8: Wherein the first HDMPs are present in a concentration of about 1.2 grams per liter to about 60 grams per liter of the first LVPadF, and wherein the first LDMBs are present in a concentration of about 25% to about 100% of the concentration of the first HDMPs in the first LVPadF.

Element B9: Wherein the first LVPadF further comprises a tackifying agent in a concentration in the range of about 0.01% to about 1% volume per volume of a liquid portion of the first LVPadF.

Element B10: Further comprising a tubular extending from a wellhead and into the subterranean formation, and a pump fluidly coupled to the tubular, the tubular containing a fluid selected from the group consisting of the SFHVFF, the first LVPadF, the first PVPropF, the DTF, and any combination thereof.

Element B11: Further comprising prior to step (f): (e1) introducing a second LVPadF into the subterranean formation above the fracture gradient, wherein the second LVPadF comprises a third aqueous base fluid, second HDMPs, and second LDMBs, and wherein a specific gravity of the second HDMPs is at least about 100% greater than a specific gravity of the second LDMBs; and (e2) placing at least a portion of the second HDMPs and the second LDMBs into the at least one first microfracture and/or the dominate fracture.

Element B12: Further comprising prior to step (f): (e1) introducing a second LVPadF into the subterranean formation above the fracture gradient, wherein the second LVPadF comprises a third aqueous base fluid, second HDMPs, and second LDMBs, and wherein a specific gravity of the second HDMPs is at least about 100% greater than a specific gravity of the second LDMBs; and (e2) placing at least a portion of the second HDMPs and the second LDMBs into the at least one first microfracture and/or the dominate fracture, wherein the second LVPadF further creates or enhances at least one second microfracture selected from the group consisting of: at least one second microfracture extending from the at least one dominate fracture, and wherein at least a portion of the second HDMPs and the second LDMBs are placed into the at least one second microfracture extending from the at least one dominate fracture, at least one second microfracture extending from the at least one first microfracture, and wherein at least a portion of the second HDMPs and the second LDMBs are placed into the at least one second microfracture extending from the at least one dominate fracture, and any combination thereof.

Element B13: Further comprising prior to step (f): (e1) introducing a second LVPadF into the subterranean formation above the fracture gradient, wherein the second LVPadF comprises a third aqueous base fluid, and second LDMBs, and wherein a specific gravity of the second LDMBs is in the range of about 0.3 to about 0.6 and a unit mesh size in the range of about 0.01 micrometers to about 150 micrometers; and (e2) placing the third LDMBs into the at least one first microfracture and/or into the far-field region of the dominate fracture.

Element B14: Further comprising prior to step (f): (e1) introducing a second LVPadF into the subterranean formation above the fracture gradient, wherein the second LVPadF comprises a third aqueous base fluid, and second LDMBs, and wherein a specific gravity of the second LDMBs is in the range of about 0.3 to about 0.6 and a unit mesh size in the range of about 0.01 micrometers to about 150 micrometers; and (e2) placing the third LDMBs into the at least one first microfracture and/or into the far-field region of the dominate fracture, wherein the second LVPadF further creates or enhances at least one second microfracture selected from the group consisting of: at least one second microfracture extending from the at least one dominate fracture, and wherein at least a portion of the second HDMPs and the second LDMBs are placed into the at least one second microfracture extending from the at least one dominate fracture, at least one second microfracture extending from the at least one first microfracture, and wherein at least a portion of the second HDMPs and the second LDMBs are placed into the at least one second microfracture extending from the at least one dominate fracture, and any combination thereof.

Element B15: Further comprising prior to step (f): (e1) introducing a second LVPadF into the subterranean formation above the fracture gradient, wherein the second LVPadF comprises a third aqueous base fluid, and second LDMBs, and wherein a specific gravity of the second LDMBs is in the range of about 0.3 to about 0.6 and a unit mesh size in the range of about 0.01 micrometers to about 150 micrometers, and wherein the second LDMBs are present in a concentration of about 0.3 grams per liter to about 60 grams per liter of the second LVPadF; and (e2) placing the third LDMBs into the at least one first microfracture and/or into the far-field region of the dominate fracture.

Element B16: Further comprising prior to step (f): (e1) introducing a second LVPadF into the subterranean formation above the fracture gradient, wherein the second LVPadF comprises a third aqueous base fluid, second HDMPs, and second LDMBs, and wherein a specific gravity of the second HDMPs is at least about 100% greater than a specific gravity of the second LDMBs; (e2) placing at least a portion of the second HDMPs and the second LDMBs into the at least one first microfracture and/or into the far-field region of the dominate fracture; (e3) introducing a second LVPropF into the subterranean formation above the fracture gradient, wherein the second LVPropF comprises a fourth aqueous base fluid, second MSPs having a unit mesh size in the range of about 150 micrometers to about 600 micrometers; and (e4) placing the MSPs and/or CSPs in the dominate fracture.

Element B17: Further comprising prior to step (f): (e1) introducing a second LVPadF into the subterranean formation above the fracture gradient, wherein the second LVPadF comprises a third aqueous base fluid, second HDMPs, and second LDMBs, and wherein a specific gravity of the second HDMPs is at least about 100% greater than a specific gravity of the second LDMBs; (e2) placing at least a portion of the second HDMPs and the second LDMBs into the at least one first microfracture and/or into the far-field region of the dominate fracture; (e3) introducing a second LVPropF into the subterranean formation above the fracture gradient, wherein the second LVPropF comprises a fourth aqueous base fluid, second MSPs having a unit mesh size in the range of about 150 micrometers to about 600 micrometers; and (e4) placing the MSPs and/or CSPs in the dominate fracture, and wherein the MSPs and/or CSPs in the second LVPropF are placed in the near-wellbore region of the dominate fracture.

By way of non-limiting example, exemplary combinations applicable to B include: B1-B17; B2, B5, and B9; B10 and B17; B3, B4, B5, and B10; B12 and B13; B10, B11, B12, and B16; B1, B6, B7, and B17; B15 and B16; B14, B15, and B17; and the like.

To facilitate a better understanding of the embodiments of the present disclosure, the following examples of preferred or representative embodiments are given. In no way should the following example be read to limit, or to define, the scope of the disclosure.

Example 1

In this example, the ability of the combination of the HDMPs and LDMBs to occupy different areas within a fracture was evaluated. In a glass vial, 17 milliliters (mL) of tap water (viscosity of about 1 cP) was added. Thereafter, 0.20 grams (g) of HDMPs (ZEEOSPHERES™ N-1000) was added to the glass vial. Next, 0.05 g of LDMBs (HGS5000) was added to the glass vial and mixed. After a period of 5 minutes to allow separation and settling of the HDMPs from the LDMBs (no tackifying agent was used), the glass vial was visually observed and the LDMBs occupied the upper portion of the glass vial, whereas the HDMPs occupied the lower portion of the glass vial.

Example 2

In this example, the ability of a low concentration of tackifying agent in combination with HDMPs and LDMBs to aid in suspension of the micro-proppant collectively was evaluated. In a glass vial, 17 mL of tap water (viscosity of about 1 cP) was added. Thereafter, 0.20 g of HDMPs (ZEEOSPHERES™ N-1000) was added to the glass vial. Next, 0.05 g of LDMBs (HGS5000) was added to the glass vial. Finally, 0.02 mL of an aqueous tackifying agent (SANDWEDGE® ABC) was included in the glass vial and mixed. After a period of 5 minutes, the glass vial was visually observed and both the LDMBs and the HDMPs were maintained in suspension. It was observed that the aqueous tackifying agent, even at such low concentration, induced adhesion between the HDMPs and the LDMBs. The presence of the LDMBs effectively lowered the density of the HDMPs such that they were observed in suspension.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   (a) introducing a solids-free high-viscosity fracturing fluid (SFHVFF) into a subterranean formation above a fracture gradient to create or enhance at least one dominate fracture in a first treatment interval therein, wherein the SFHVFF has a viscosity in a range of about 100 centipoise (cP) to about 20,000 cP at a shear rate of 40 sec$^{-1}$ at a temperature in a range of about 15° C. to about 25° C.;
   (b) introducing a first low-viscosity pad fluid (LVPadF) into the subterranean formation above the fracture gradient to create or enhance at least one first microfracture extending from the at least one dominate fracture, wherein the first LVPadF has a viscosity in a range of about 0.1 centipoise (cP) to about 250 cP at a shear rate of 40 sec$^{-1}$ at a temperature in a range of about 15° C. to about 25° C.;
      wherein the first LVPadF comprises a first aqueous base fluid, first high density micro-proppants (HDMPs), and first low-density micro-beads (LDMBs), wherein the first HDMPs have a unit mesh size in the range of about 0.01 micrometers to about 150 micrometers, and wherein the first LDMBs have a unit mesh size in the range of about 0.01 micrometers to about 150 micrometers; and
      wherein the specific gravity of the first HDMPs is in the range of about 1.75 to about 3.65, and the specific gravity of the first LDMBs is in the range of about 0.3 to about 0.6, wherein the specific gravity of the first HDMPs is at least about 100% greater than the specific gravity of the first LDMBs;
   (c) placing at least a portion of the first HDMPs and the first LDMBs into the at least one first microfracture to create at least a partial monolayer therein;
   (d) introducing a first low-viscosity proppant fluid (LVPropF) into the subterranean formation above the fracture gradient, wherein the first LPropF has a viscosity in a range of about 0.1 centipoise (cP) to about 250 cP at a shear rate of 40 sec$^{-1}$ at a temperature in a range of about 15° C. to about 25° C.;
      wherein the first LVPropF comprises a second aqueous base fluid and first medium-sized proppants (MSPs), wherein the first MSPs have a unit mesh size in the range of about 150 micrometers to about 600 micrometers; and
   (e) placing at least a portion of the first MSPs into the at least one dominate fracture.

2. The method of claim 1, further comprising applying incrementally increased fracturing rate steps to the first SFHVFF.

3. The method of claim 1, wherein the first HDMPs and the first LDMBs placed into the at least one first microfracture in step (c) create at least a partial multilayer therein.

4. The method of claim 1, wherein the at least one first microfracture is formed in a far-field and/or the near-wellbore region of the subterranean formation.

5. The method of claim 1, wherein a plurality of first microfractures is formed in either or both of the far-field region and/or the near-wellbore region of the subterranean formation.

6. The method of claim 1, wherein the MSPs in the first LVPropF fluid are placed in the far-field region of the dominate fracture.

7. The method of claim 1, wherein the first HDMPs are present in a concentration of about 1.2 grams per liter to about 60 grams per liter of the first LVPadF, and wherein the first LDMBs are present in a concentration of about 25% to about 100% of the concentration of the first HDMPs in the first LVPadF.

8. The method of claim 1, wherein the first LVPadF further comprises a tackifying agent in a concentration in the range of about 0.01% to about 1% volume per volume of a liquid portion of the first LVPadF.

9. The method of claim 1, further comprising:
   (f) introducing a second LVPadF into the subterranean formation above the fracture gradient, wherein the second LVPadF comprises a third aqueous base fluid, second HDMPs, and second LDMBs, and
      wherein a specific gravity of the second HDMPs is at least about 100% greater than a specific gravity of the second LDMBs; and
   (g) placing at least a portion of the second HDMPs and the second LDMBs into the at least one first microfracture and/or the dominate fracture.

10. The method of claim 9, wherein the second LVPadF further creates or enhances at least one second microfracture selected from the group consisting of:
- at least one second microfracture extending from the at least one dominate fracture, and wherein at least a portion of the second HDMPs and the second LDMBs are placed into the at least one second microfracture extending from the at least one dominate fracture,
- at least one second microfracture extending from the at least one first microfracture, and wherein at least a portion of the second HDMPs and the second LDMBs are placed into the at least one second microfracture extending from the at least one dominate fracture, and any combination thereof.

11. The method of claim 1, further comprising:
(f) introducing a second LVPadF into the subterranean formation above the fracture gradient,
  wherein the second LVPadF comprises a third aqueous base fluid, and second LDMBs, and wherein a specific gravity of the second LDMBs is in the range of about 0.3 to about 0.6 and a unit mesh size in the range of about 0.01 micrometers to about 150 micrometers; and
(g) placing the second LDMBs into the at least one first microfracture and/or into the far-field region of the dominate fracture.

12. The method of claim 11, wherein the second LVPadF further creates or enhances at least one second microfracture selected from the group consisting of:
- at least one second microfracture extending from the at least one dominate fracture, and wherein at least a portion of the second HDMPs and the second LDMBs are placed into the at least one second microfracture extending from the at least one dominate fracture,
- at least one second microfracture extending from the at least one first microfracture, and wherein at least a portion of the second HDMPs and the second LDMBs are placed into the at least one second microfracture extending from the at least one dominate fracture, and any combination thereof.

13. The method of claim 11, wherein the second LDMBs are present in a concentration of about 0.3 grams per liter to about 60 grams per liter of the second LVPadF.

14. The method of claim 1, further comprising:
(f) introducing a second LVPadF into the subterranean formation above the fracture gradient, wherein the second LVPadF comprises a third aqueous base fluid, second HDMPs, and second LDMBs, and
  wherein a specific gravity of the second HDMPs is at least about 100% greater than a specific gravity of the second LDMBs;
(g) placing at least a portion of the second HDMPs and the second LDMBs into the at least one first microfracture and/or into the far-field region of the dominate fracture;
(h) introducing a second LVPropF into the subterranean formation above the fracture gradient,
  wherein the second LVPropF comprises a fourth aqueous base fluid, second MSPs having a unit mesh size in the range of about 150 micrometers to about 600 micrometers; and
(i) placing the MSPs in the dominate fracture.

15. The method of claim 14, wherein the MSPs and/or CSPL; in the second LVPropF are placed in the near-wellbore region of the dominate fracture.

16. The method of claim 1, further comprising a tubular extending from a wellhead and into the subterranean formation, and a pump fluidly coupled to the tubular, the tubular containing a fluid selected from the group consisting of the SFHVFF, the first LVPadF, the first LVPropF, and any combination thereof.

17. A method comprising:
(a) introducing a solids-free high-viscosity fracturing fluid (SFHVFF) into a subterranean formation above a fracture gradient to create or enhance at least one dominate fracture in a first treatment interval therein, wherein the SFHVFF has a viscosity in a range of about 100 centipoise (cP) to about 20,000 cP at a shear rate of 40 $\sec^{-1}$ at a temperature in a range of about 15° C. to about 25° C.;
(b) introducing a first low-viscosity pad fluid (LVPadF) into the subterranean formation above the fracture gradient to create or enhance at least one first microfracture extending from the at least one dominate fracture, wherein the first LVPadF has a viscosity in a range of about 0.1 centipoise (cP) to about 250 cP at a shear rate of 40 $\sec^{-1}$ at a temperature in a range of about 15° C. to about 25° C.;
  wherein the first LVPadF comprises a first aqueous base fluid, first high density micro-proppants (HDMPs), and first low-density micro-beads (LDMBs)$_L$ wherein the first HDMPs have a unit mesh size in the range of about 0.01 micrometers to about 150 micrometers, and wherein the first LDMBs have a unit mesh size in the range of about 0.01 micrometers to about 150 micrometers; and
  wherein the specific gravity of the first HDMPs is in the range of about 1.75 to about 3.65, and the specific gravity of the first LDMBs is in the range of about 0.3 to about 0.6, wherein the specific gravity of the first HDMPs is at least about 100% greater than the specific gravity of the first LDMBs;
(c) placing at least a portion of the first HDMPs and the first LDMBs into the at least one first microfracture to create at least a partial monolayer therein;
(d) introducing a low-viscosity proppant fluid (LVPropF) into the subterranean formation above the fracture gradient, wherein the LVPropF has a viscosity in a range of about 0.1 centipoise (cP) to about 250 cP at a shear rate of 40 $\sec^{-1}$ at a temperature in a range of about 15° C. to about 25° C.;
  wherein the LVPropF comprises a second aqueous base fluid and medium-sized proppants (MSPs), wherein the MSPs have a unit mesh size in the range of about 150 micrometers to about 600 micrometers;
(e) placing at least a portion of the MSPs into the at least one dominate fracture;
(f) introducing a diverting treatment fluid (DTF) into the subterranean formation below the fracture gradient,
  wherein the DTF comprises a third aqueous base fluid and a diverting package, the diverting package comprising degradable particulates and non-degradable particulates; and
(g) placing the diverting package into a mouth of the at least one dominate fracture.

18. The method of claim 17, further comprising applying incrementally increased fracturing rate steps to the first SFHVFF.

* * * * *